June 18, 1963  F. C. VAN ARSDELL  3,094,487
PROCESS OF CENTRIFUGAL SEPARATION
Filed Oct. 6, 1959  2 Sheets-Sheet 1

INVENTOR.
FRED C. VAN ARSDELL
ATTORNEYS

INVENTOR.
FRED C. VAN ARSDELL

United States Patent Office 3,094,487
Patented June 18, 1963

3,094,487
PROCESS OF CENTRIFUGAL SEPARATION
Fred C. Van Arsdell, Medina, Ohio, assignor to The Quaker Oats Company, Chicago, Ill., a corporation of New Jersey
Filed Oct. 6, 1959, Ser. No. 844,799
2 Claims. (Cl. 233—28)

The present invention relates to the centrifugal separation of materials of common origin but having different or varied specific gravities or densities. More particularly, the invention relates to the separation of compact, relatively heavy solid materials from semi-fluid mixtures of the solid materials and relatively light materials. Specifically, the concepts of the invention are disclosed as used for the separation of solid materials from masses of ground fish or the like, which are being processed for subsequent use as an ingredient of pet foods.

The basic ingredient of at least one well known brand of cat food it fish. For economic reasons, the best kind of fish is that which is least expensive. Thus, cod or salmon or tuna, etc., is very seldom, if ever, used as a cat food. Fish which are generally not used for human consumption, such as hake, whiting, ocean or ling pout, croakers, ribbon fish and sea trout, or any of the other common, non-premium teleost, are the principal varieties used. Also, the raw fish are supplied in a variety of sizes.

The most laborious step in the production of pet food from raw fish is the cleaning process. The removal of the non-edible skeletal structure, otoliths and spiny fins, together with the elimination of associated foreign matter, such as sand, shells, and stone, have heretofore only been successfully accomplished by tedious manual labor. This is especially inefficient when smaller fish are used.

Increased labor costs required that the cleaning process be performed by machine. However, various methods and machinery heretofore used and tested have had inherent deficiencies preventing successful operation and are as impractical and uneconomical as the previous manual techniques.

Centrifugal separation of materials of different densities is not new. However, the prior art apparatus and processes have never been successfully applied to the separation of the edible portions of a fish from the non-edible.

One of the major problems was bruising. If a centrifuge is to be used, high speed rotation and consequent large magnitude centrifugal forces must be present. A commercially successful process for the instant purpose demands as little interruption as possible; that is, it is most desirable to be able to feed the raw or ground fish continuously and have the treated material be continuously expelled. This necessitates, in a process employing a centrifuge, the orderly expulsion of the material from the rotating container. The path it follows must be free to avoid clogging and at the same time confining to control the flow. However, when centrifugally expelling fish particles, the particles must not be permitted to bruisingly impinge on a striking surface. If the particles are allowed to bruise, the pet food made therefrom has a glue-like consistency and is highly undesirable as a food.

Further, such incorrect "impinging" will cause air to be embedded in the material. This, too, is a major problem in centrifuging fish particles. Specifically, the excess oxygen present in the air promotes enzymatic discoloration.

These problems have been the major obstacles to the successful machine processing of fish for pet food.

Therefore, as a solution to these problems it is an object of the present invention to provide a process of operating a centrifugal separator whereby skeletal structure, spiny fins, otoliths, stones, sand, shells, or any other foreign matter (relatively heavy solid material) can be removed from ground fish.

It is another object of the present invention to provide a process of operating a centrifugal separator wherein the rotating container or basket is so constructed as to retain the relatively heavy solid material or foreign matter removed from the ground fish and to discharge the edible fish particles clarified for use in pet food.

It is a further object of the present invention to provide a process of operating a centrifugal separator which will not be clogged by the clarified fish particles which are expelled.

It is a still further object of the present invention to provide a process of operating a centrifugal separator having a striking surface, against which the expelled clarified fish particles are lightly impinged, of such a construction that the edible fish particles are not bruised and the amount of oxygen embedded therein is greatly reduced.

Still another object of the present invention is to provide a process wherein such a centrifugal separator is employed to continuously prepare ground fish as a pet food ingredient.

These and other objects which will become apparent to the reader of the following specification are accomplished by means hereinafter described and claimed.

One preferred embodiment of the centrifugal separator is shown by way of example in the accompanying drawings and hereinafter described in detail without attempting to show all of the various forms and modifications in which the invention might be embodied; the invention being measured by the appended claims and not by the details of the specification.

Referring to the drawings.

In general, the manufacture of pet food from fish utilizing, as one of the steps, the techniques and apparatus herein disclosed involves grinding the raw fish. The ground fish are then fed into the lower portion of the rotating container of the improved centrifugal separator which is rotated at a sufficient speed to produce, for example, approixmately 440 G's. The initial quantity of ground fish fed into the container merely begins to fill the retained volume. As additional amounts are fed into the container the fish particles, which is normal composition consist of 75% water, flow vertically up the inside of the container. As the ground fish particles traverse this vertical path they are subjected to gravitational and centrifugal forces. These forces effect a separation of the denser bones, fins, otoliths, and other unwanted foreign materials. Specifically, the denser objects are moved laterally outward within the mass and are confined within the retained volume of the container. The less dense edible portion of the fish along the inner circumference of the volume of material within the container is thus clarified of the laterally moving foreign material. As more and more ground fish is fed into the centrifugal separator the retained mass acquires a small inside diameter until it is finally permitted to be expelled from the top of the rotating container. These clarified fish particles expelled lightly impinge upon a critically shaped striking surface and are funneled to the mixing and cooking apparatus where the final steps in the preparation of pet food are completed.

Figure 1:
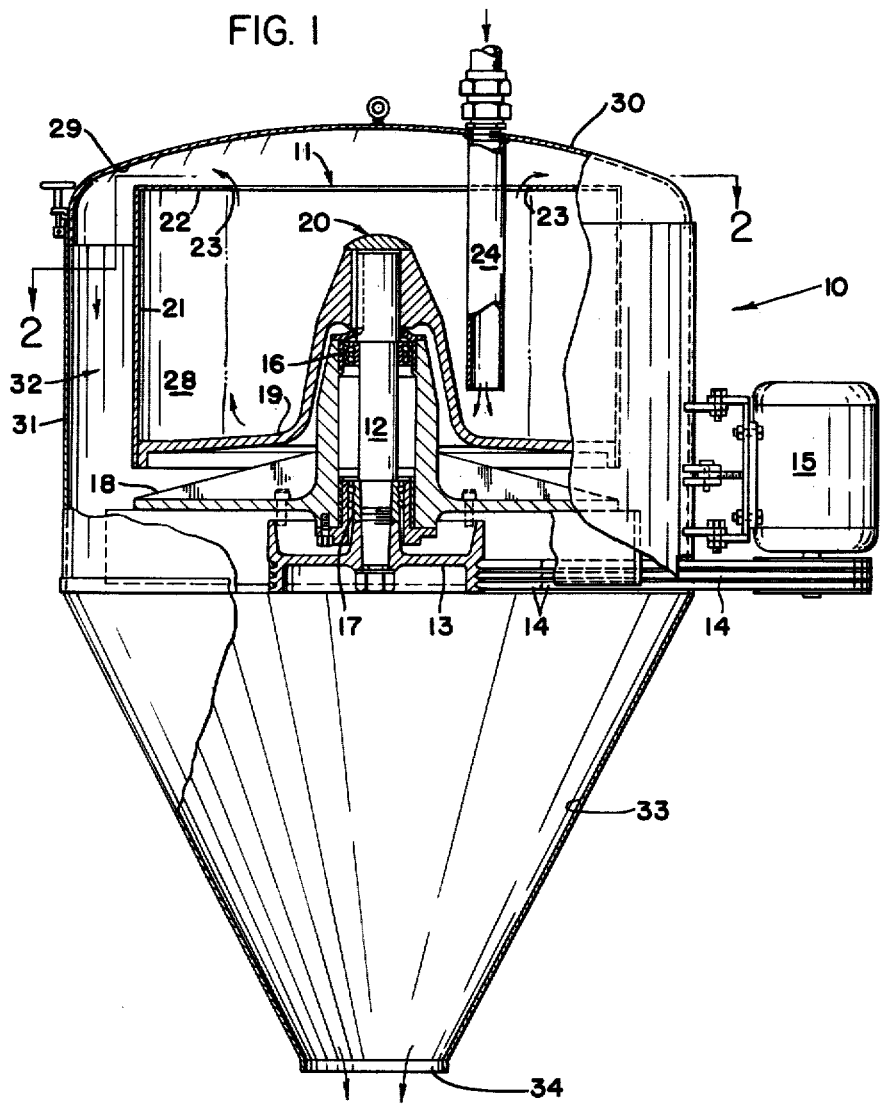
FIG. 1 is an elevation, partly in cross section, of an improved centrifugal separator according to the concepts of the invention.
Figure 2:
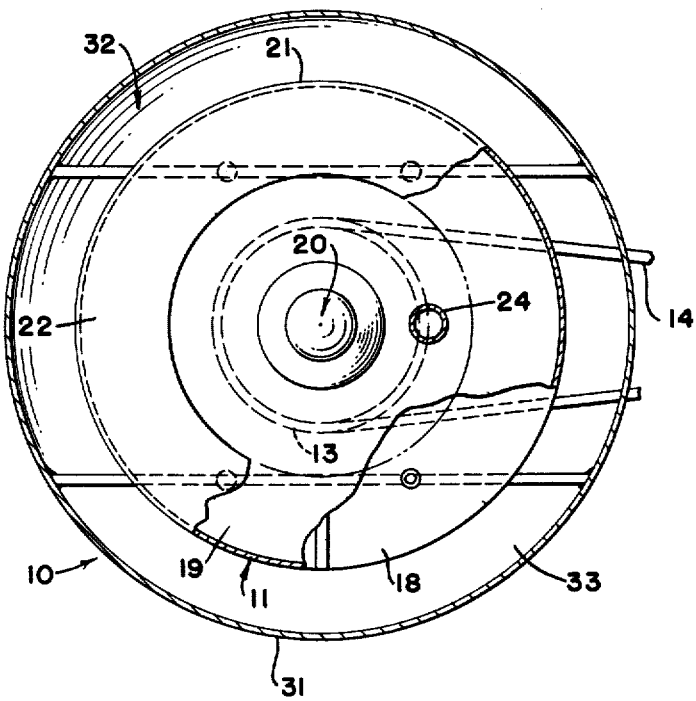
FIG. 2 is a plan view taken substantially as indicated on line 2—2 in FIG. 1.

Referring now to FIG. 1, the centrifugal separator is indicated generally by the numeral 10. The rotating container or basket 11 is preferably cylindrical and open at the top, has imperforate bottom and side walls, and is symmetrically mounted on vertical shaft 12. Shaft 12 also mounts a multiple sheave 13 which is connected by belts 14 to a suitable power source, such as motor 15. Shaft 12 is medially supported through suitable bearings 16 and 17 by frame 18.

The base or bottom wall 19 of container 11 is adapted, at its center 20, for connection to shaft 12. The cylindrical side wall 21 is affixed to the circumference of base 19. The top circumference of side 21 terminates in a radially inwardly disposed retaining lip 22. Base 19, side 21 and lip 22 are each imperforate.

Extending through the discharge opening delineated by the inner periphery 23 of lip 22 is a feed pipe 24 which extends axially of the container 11, ending adjacent to the base 19. This positioning of the terminus of pipe 24 assures that the ground fish particles entering through pipe 24 will be required to traverse the maximum distance within container 11 and thereby be subjected to the separating centrifugal forces as long as possible before being expelled from the container 11 over the inner periphery 23 of lip 22.

Figure 3:
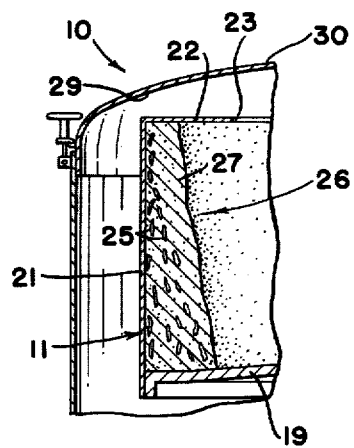
FIG. 3 is a fragmentary side sectional view showing the condition of the rotating container of the separator shortly after commencement of rotation.

As shown by FIG. 3, the initial portion of ground fish introduced into the container 11 through pipe 24 is distributed centrifugally against the side wall 21 and is retained within the container by the lip 22. That is, the invention contemplates centrifugally forming a cylindrical mass of the semi-fluid mixture. The relatively heavy solid materials or foreign material, collectively designated by the numeral 25, begin to concentrate in the radially outermost portion of the confined cylindrical mass 26. The clarified portion of relatively light or edible material, designated generally by the numeral 27, occupies the radially inner portion of the mass 26.

Figure 4:
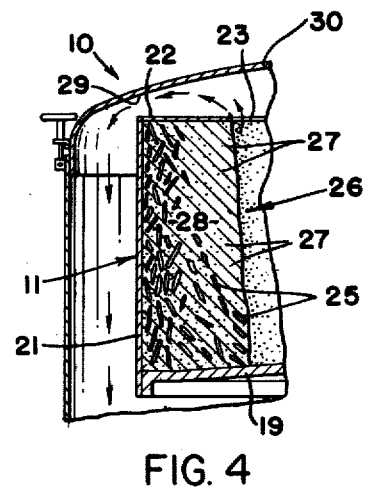
FIG. 4 is a view similar to FIG. 3, but showing the condition of the separator after an additional period of rotation with relatively heavy solid particles being retained within the rotating container of the separator.

Referring to FIG. 4, as additional portions of the semi-fluid mixture of ground fish are introduced through pipe 24 into the rotating container 11, the wall of the confined mass 26 increases in cross-sectional thickness until it fills the retained volume area 28 of container 11, the minimum radial dimension of which is predetermined or defined by the width of the lip 22. In practice, for example, using a 30" diameter container 11 with a lip 22 having a width of 6", leaving a discharge opening of about 18", has been found to be satisfactory.

When the confined mass 26 approximates in size the retained volume area 28 of the cylinder 11, the solid materials 25 are being displaced radially outwardly and the light materials 27 are concentrated radially inwardly. Under these conditions (FIG. 4), the further introduction of portions of the semi-fluid mixture will cause controlled or equivalent portions of clarified material to be expelled from the container 11, over lip 22 as shown by the arrows, while substantially all the solid materials 25 are reduced or lesser amounts of edible or light materials are retained in the confined mass 26. The solid materials 25 accumulate along the side wall 21 and continuously displace the edible material retained in the confined mass 26 radially inwardly, accomplishing the desired separation. Periodically, the centrifugal separator must be stopped and the solid material 25 removed from the retained volume 28 to prevent the accumulated build-up of material 25 from overflowing lip 22.

As the particles of clarified fish from portion 27 are expelled over periphery 23 of lip 22 they are thrown radially outward by the rotative motion of container 11 whereupon they lightly impinge upon specially shaped striking surface 29. As shown, surface 29 may be the interior surface of a cover 30 extending over and across the open top of the separator 10. The surface 29 of cover 30 is characterized by the critical angular disposition relative to the path of the expelled particles. Specifically, the fish particles do not bruise or acquire undesired oxygen if they impinge upon striking surface 29 at a low angle of incidence, approximately 10–15° having been found to be most desirable, the angle of incidence being measured between the surface 29 and the approach trajectory path of expelled fish particles.

After lightly ricocheting off surface 29 the particles are deflected downwardly between the outer circumference of wall 21 and casing 31. The dimension of this passage 32 between container 11 and casing 31 must be sufficiently great so that the inherently moist fish particles passing therebetween do not clog the passage 32.

These axially dropping particles are collected in an area beneath the surface 29 of cover 30 and below the base of container 11 and then funneled through substantially conically shaped guide 33 which is adapted, at its greatest diameter, to engage the entire periphery of the casing 31. A port 34 at the lower end of guide 33 collects the clarified fish particles for passage to equipment of the next step of the pet food manufacturing process.

As can now be seen, the concepts of the invention provide a simple, efficient and practical way in which to remove relatively heavy solid or foreign material from semi-fluid mixtures of ground fish without deleterious effects on the clarified fish particles. Other uses of the invention will suggest themselves and therefore the scope of the invention is intended to be limited only by the scope of the appended claims.

What is claimed is:

1. A process using a centrifugal separator with a rotating container open at the top and having imperforate base and side walls to separate solid, non-edible materials from masses of ground fish containing edible particles, comprising the steps of, rotating the container to distribute a portion of said ground fish introduced into the container radially outwardly against the side wall of the container, retaining said radially outwardly distributed portion as a centrifugally formed cylindrical mass having a wall of predetermined thickness, introducing additional portions of said ground fish into said container and then radially outwardly into the centrifugally formed mass to displace edible particles radially inwardly of said mass and to expel controlled portions of edible particles through the open top of said container while retaining non-edible materials and lesser amounts of edible particles within said centrifugally formed mass, impinging said expelled particles at a low angle of incidence against a curved cover surface extending over and above the open top of the container, the angle of incidence being measured between said surface and the approach trajectory path of said expelled particles, the impinging at said low angle of incidence preventing said expelled particles from being bruised and from acquiring undesired oxygen, and collecting said particles in an area beneath the cover surface and below the base of said container.

2. A process according to claim 1 in which said angle of incidence is approximately 10–15°.

References Cited in the file of this patent

UNITED STATES PATENTS

| | | |
|---|---|---|
| 299,904 | Borchers | June 3, 1884 |
| 556,567 | Waring | Mar. 17, 1896 |
| 1,304,840 | Williams | May 27, 1919 |
| 2,193,871 | Hanno | Mar. 19, 1940 |
| 2,394,015 | Schutte et al. | Feb. 5, 1946 |
| 2,553,936 | Patrick | May 22, 1951 |

FOREIGN PATENTS

| | | |
|---|---|---|
| 534,265 | Italy | Oct. 13, 1955 |

UNITED STATES PATENT OFFICE
CERTIFICATE OF CORRECTION

Patent No. 3,094,487                      June 18, 1963

Fred C. Van Arsdell

It is hereby certified that error appears in the above numbered patent requiring correction and that the said Letters Patent should read as corrected below.

Column 1, line 33, for "stone" read -- stones --; column 2, line 56, for "approixmately" read -- approximately --; line 59, for "is" read -- in --; line 72, for "small" read -- smaller --.

Signed and sealed this 7th day of July 1964.

(SEAL)
Attest:

ERNEST W. SWIDER
Attesting Officer

EDWARD J. BRENNER
Commissioner of Patents